United States Patent
DeWit et al.

(10) Patent No.: US 8,842,950 B2
(45) Date of Patent: Sep. 23, 2014

(54) DIAMOND OPTICAL COMPONENT FOR AN OPTICAL TOOL

(75) Inventors: Hendrikus Gerardus Maria DeWit, Cuijk (NL); Gerrit Jan Pels, Cuijk (NL); Berdinus Christianus Maria Vrolijk, Cuijk (NL)

(73) Assignee: Element Six N.V. (NL)

( * ) Notice: Subject to any disclaimer, the term of this patent is extended or adjusted under 35 U.S.C. 154(b) by 0 days.

(21) Appl. No.: 13/821,956

(22) PCT Filed: Sep. 8, 2011

(86) PCT No.: PCT/EP2011/065576
§ 371 (c)(1),
(2), (4) Date: Jun. 10, 2013

(87) PCT Pub. No.: WO2012/034926
PCT Pub. Date: Mar. 22, 2012

(65) Prior Publication Data
US 2014/0119693 A1    May 1, 2014

Related U.S. Application Data

(60) Provisional application No. 61/383,210, filed on Sep. 15, 2010.

(30) Foreign Application Priority Data

Sep. 15, 2010  (GB) .................................. 1015379.9

(51) Int. Cl.
G02B 6/26    (2006.01)
G02B 7/00    (2006.01)
G02B 6/42    (2006.01)

(52) U.S. Cl.
CPC .............. G02B 6/4267 (2013.01); G02B 7/00 (2013.01); G02B 6/262 (2013.01)

USPC .................................. 385/43; 385/39; 385/15

(58) Field of Classification Search
CPC .......... G02B 6/26; G02B 6/1228; G02B 6/43; G02B 6/262; G02B 6/1221
USPC ................................................. 385/15, 39, 43
See application file for complete search history.

(56) References Cited

U.S. PATENT DOCUMENTS 4,170,997 A    10/1979    Pinnow et al.
5,046,854 A     9/1991    Weller et al.
(Continued)

FOREIGN PATENT DOCUMENTS

DE    102009010541 A1    9/2010
EP         1903361 A1    3/2008
(Continued)

OTHER PUBLICATIONS

International Search Report for PCT/EP2011/065576 dated Jun. 12, 2011.
(Continued)

Primary Examiner — Charlie Peng
Assistant Examiner — Mary El Shammaa
(74) Attorney, Agent, or Firm — Bryan Cave LLP

(57) ABSTRACT

A component for an optical probe, the component comprising: a tubular body defining an internal channel and an opening; a mounting ring which is mounted within the internal channel and configured to define an aperture aligned with the opening; and a window disposed across the aperture and bonded to the mounting ring around the aperture, wherein the window is diamond, wherein the mounting ring comprises a material having a coefficient of linear thermal expansion a of $14 \times 10^{-6}$ $K^{-1}$ or less at 20° C. and a thermal conductivity of 60 $Wm^{-1}K^{-1}$ or more at 20° C., and wherein the tubular body is made of a chemically inert material.

16 Claims, 3 Drawing Sheets

(56) References Cited

U.S. PATENT DOCUMENTS

| | | | |
|---|---|---|---|
| 5,303,324 A | 4/1994 | Lundahl | |
| 6,104,853 A | 8/2000 | Miyagi et al. | |
| 6,115,528 A | 9/2000 | Schmucker et al. | |

FOREIGN PATENT DOCUMENTS

| | | | |
|---|---|---|---|
| GB | 2423816 A2 | 9/2006 | |
| JP | 5095962 A | 4/1993 | |
| JP | 09-028715 A | 2/1997 | |
| JP | 2004-085433 A | 3/2004 | |
| WO | 93/25155 A1 | 12/1993 | |
| WO | 01/73338 A1 | 10/2001 | |

OTHER PUBLICATIONS

Search Report for GB1015379.9 dated Dec. 8, 2010.
Search Report for GB1115532.2 dated Nov. 16, 2011.

DIAMOND OPTICAL COMPONENT FOR AN OPTICAL TOOL

FIELD OF INVENTION

The present invention relates to a diamond optical component for an optical tool. Certain embodiments relate to an optical probe for chemical analysis, particularly in harsh chemical and/or thermal environments.

BACKGROUND OF INVENTION

The use of diamond as an optical component such as a flat window, prism, or lens in an optical tool is known. For example, JP 9028715, JP 5095962, U.S. Pat. No. 4,170,997 and U.S. Pat. No. 6,104,853 disclose the use of diamond as a window material disposed in the end of a medical laser tool. Diamond is useful as a window material as it has low absorption. Diamond has the additional advantage over other possible window materials in that it is mechanically strong, inert, and biocompatible. For example, the inertness of diamond makes it an excellent choice for use in reactive chemical environments where other optical window materials would not be suitable.

One problem with using diamond as a window material is that the diamond window has a tendency to de-bond from the optical tool to which it is attached, for example due to chemical and/or thermal conditions. Another related problem when faced with designing an optical tool for use in reactive chemical environments is how to improve diamond window bonding whilst also ensuring that the optical tool is chemically inert to the reactive chemical environments in which it is to be used.

It is an aim of certain embodiments of the present invention to solve the aforementioned problems. In particular, certain embodiments of the present invention seek to provide an optical tool which is stable, reliable, has improved lifetime, and can be made small in size. Particular embodiments are aimed at providing a chemically inert optical probe with a diamond window, particularly for insertion into harsh chemical environments to perform spectroscopic analysis such as in a chemical reactor housing acidic reactants. Application areas include the pharmaceuticals industry where manufacturers are required to provide process data including a chemical analysis of their processes.

SUMMARY OF INVENTION

A first aspect of the present invention provides a component for an optical probe, the component comprising:
a tubular body defining an internal channel and an opening;
a mounting ring which is mounted within the internal channel and configured to define an aperture aligned with the opening; and
a window disposed across the aperture and bonded to the mounting ring around the aperture,
wherein the window is diamond,
wherein the mounting ring comprises a material having a coefficient of linear thermal expansion $\alpha$ of $14.0 \times 10^{-6}$ $K^{-1}$ or less at 20° C. and a thermal conductivity of 60 $Wm^{-1}K^{-1}$ or more at 20° C.,
wherein the tubular body is made of a chemically inert material, and
wherein the tubular body comprises an internally tapered end portion and the mounting ring is press-fit into the tapered end portion.

According to a second aspect of the present invention there is provided an optical tool comprising:
an optical fibre for transmitting light; and
a component as described above attached to an end of said optical fibre.

The component can thus be attached to the end of an optical fibre for transmitting and/or receiving light through the diamond window. The window may be flat or may be some other shape such as a prism or curved lens.

BRIEF DESCRIPTION OF THE DRAWINGS

For a better understanding of the present invention and to show how the same may be carried into effect, embodiments of the present invention will now be described by way of example only with reference to the accompanying drawings, in which.

DETAILED DESCRIPTION OF CERTAIN EMBODIMENTS

Figure 1:
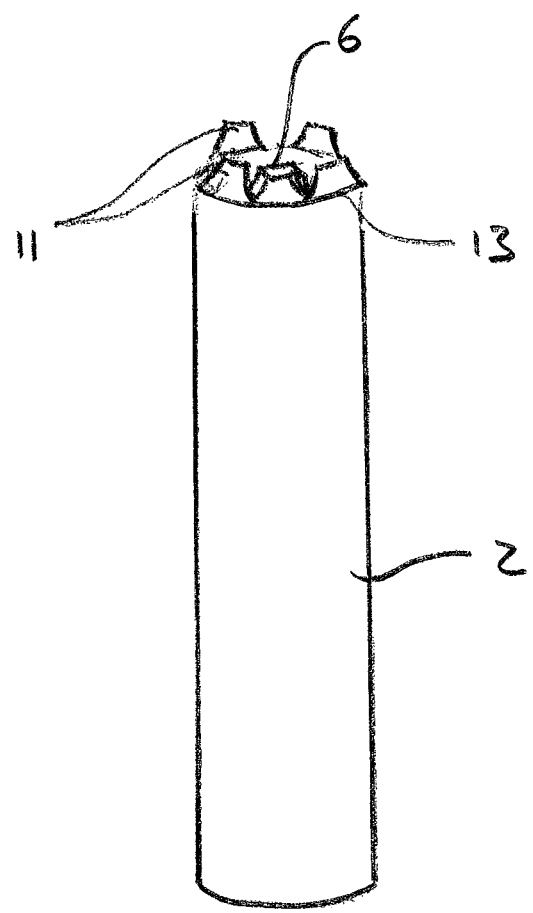
FIG. 1 illustrates a perspective view of a diamond window component for an optical tool according to an embodiment of the present invention.

The present inventors have traced the problem of diamond window de-bonding in a tubular optical probe to a thermal mismatch between the diamond window and the tubular body to which it is bonded. It has been found that the small end tip of the optical tool can become very hot during operation. Temperatures of approximately 200° C. have been observed. This heating effect is exacerbated by the small size of the end tip which requires relatively little energy to rapidly increase in temperature. The increase in temperature causes the diamond window and the tubular body to expand at different rates causing stress at the join between the diamond window and the tubular body. This is because diamond has a much lower coefficient of thermal expansion compared with standard materials used to form the tubular body such as stainless steel. If the stress becomes too large, then the join fails and the window de-bonds from the tubular body. Repeated heating and cooling in use can exacerbate this problem. Furthermore, autoclaving the apparatus in order to sterilize the apparatus between uses can also exacerbate this problem.

A similar problem can also occur during manufacture of the component if any thermal processing steps are utilized. For example, if the diamond window is welded or brazed to the tubular body, strain generated during cooling of the component due to a mismatch in thermal expansion coefficient can cause the diamond window to de-bond.

One way to alleviate some of the aforementioned problems is to provide an efficient cooling system to prevent the end tip from heating too rapidly or becoming too hot. However, incorporating an efficient cooling system can increase the size and complexity of the device which is not desirable.

An alternative possibility is to provide a flexible join between the diamond window and the tubular body. However, flexible joins such as polymer adhesives are susceptible to melting and burning during use and/or are not suitable for autoclaving and/or reactive chemical environments.

An alternative possibility for solving the aforementioned problem it to manufacture the tubular body from a material which has a coefficient of thermal expansion closer to that of diamond than, for example, standard stainless steel. In this regard, stainless steel has a coefficient of linear thermal expansion α of approximately $17\times10^{-6}$ $K^{-1}$ at 20° C. (this value varies depending on the particular formulation of stainless steel). Diamond has a coefficient of linear thermal expansion α of $1.1\times10^{-6}$ $K^{-1}$ at 20° C. As such, manufacturing the tubular body from a material such as titanium (which has a coefficient of linear thermal expansion α of $8.6\times10^{-6}$ $K^{-1}$ at 20° C.) would be expected to alleviate the problem of diamond window delamination. In practice however, it was found that this did not solve the problem.

The present inventors traced the problem with the titanium tubular body arrangement to the relatively poor thermal conductivity of titanium. Titanium has a thermal conductivity of about 21 $Wm^{-1}K^{-1}$ at 20° C. Heat build up at the tip of the laser tool around the diamond window is exacerbated if the heat cannot be conducted away from the diamond window. As such, even though the thermal expansion coefficient of titanium and diamond are better matched, a large and rapid increase in temperature during use due to the poor thermal conductivity of titanium offsets this benefit.

One possible way to solve the aforementioned problem is to use a material for the tubular body which has a very high thermal conductivity such as silver (which has a thermal conductivity of 429 $Wm^{-1}K^{-1}$ at 20° C.) or copper (which has a thermal conductivity of 393 $Wm^{-1}K^{-1}$ at 20° C.). However, it was found that even though local heat build-up around the diamond window can be reduced using such materials, the thermal expansion coefficients of these materials are too large ($19.5\times10^{-6}$ $K^{-1}$ at 20° C. for silver and $16.6\times10^{-6}$ $K^{-1}$ at 20° C. for copper). As such, a lower and slower increase in temperature is still sufficient to generate enough stress for the diamond window to delaminate from the tubular body.

In light of the above, the present inventors have found that in order to solve the problem of diamond window delamination, the tubular body to which it is bonded must be made of a material having a relatively low thermal expansion coefficient and a relatively high thermal conductivity. The present inventors found that tubular body can be made of a material having a coefficient of linear thermal expansion α of $14\times10^{-6}$ $K^{-1}$ or less at 20° C. and a thermal conductivity of 60 $Wm^{-1}K^{-1}$ or more at 20° C. Various materials fall within these ranges, molybdenum being an example. However, while the use of such a tubular body can solve the problem of diamond window delamination, materials such as molybdenum are relatively reactive and are not suitable for use in reactive chemical environments such as highly acidic environments.

One possible way of getting around this further problem is to coat the tubular body with a non-reactive coating such as a gold coating. However, it has been found that such coatings can be readily scratched thus exposing the underlying material which then can react with the external chemical environment degrading the optical probe and contaminating the chemical environment in which the probe is placed. This problem can be remedied by making the tubular body of a chemically inert material such as hastelloy C-276. However, such chemically inert materials do not generally meet the dual requirements of a low thermal expansion coefficient and a relatively high thermal conductivity. As such, the diamond window will tend to delaminate for the reasons previously described.

In order to solve the aforementioned problem, the present inventors have realized that to provide a chemically inert optical probe with a diamond window requires both a chemically inert tubular body and a mounting ring which is made of a material having a coefficient of linear thermal expansion α of $14.0\times10^{-6}$ $K^{-1}$ or less at 20° C. and a thermal conductivity of 60 $Wm^{-1}K^{-1}$ or more at 20° C. The mounting ring is mounted within the chemically inert tubular body and the diamond window is bonded to the mounting ring. As such, the chemically inert tubular body protects the mounting ring from the external chemical environment and the mounting ring provides a reliable bonding to the diamond window to prevent delamination. If any exposed areas of the mounting ring remain around the diamond window they can be coated with an inert material such as gold to prevent adverse reactions.

The coefficient of linear thermal expansion α is advantageously $12.0\times10^{-6}$ $K^{-1}$ or less, $10.0\times10^{-6}$ $K^{-1}$ or less, $8.0\times10^{-6}$ $K^{-1}$ or less, $6.0\times10^{-6}$ $K^{-1}$ or less, or $4.0\times10^{-6}$ $K^{-1}$ or less.

The thermal conductivity is advantageously 60 $Wm^{-1}K^{-1}$ or more, 80 $Wm^{-1}K^{-1}$ or more, 100 $Wm^{-1}K^{-1}$ or more, 120 $Wm^{-1}K^{-1}$ or more, or 140 $Wm^{-1}K^{-1}$ or more.

The mounting ring may be formed of at least 50% of the low thermal expansion coefficient/high thermal conductivity material. More preferably, the mounting ring is formed of at least 70% of said material, at least 80% of said material, at least 90% of said material, or at least 95% of said material. The material may be a metal, an alloy, a ceramic, or a composite material. Examples of such materials include one or more of molybdenum, chromium, tungsten, nickel, rhodium, ruthenium, silicon carbide (SiC), tungsten carbide (WC), aluminium nitride (AlN), molybdenum alloys such as titanium zirconium molybdenum (TZM), and tungsten alloys such as tungsten nickel iron (WNiFe) and tungsten nickel copper (WNiCu). Another possibility is to manufacture the mounting ring from a diamond material such as polycrystalline CVD diamond.

Molybdenum has been found to be particularly useful as it can readily be manufactured into a mounting ring, has a low thermal expansion coefficient of $5\times10^{-6}$ $K^{-1}$, and has a relatively high thermal conductivity of 144 $Wm^{-1}K^{-1}$.

The mounting ring may be a relatively flat ring-shaped member, somewhat like a washer. However, in order to thermally conduct heat away from the diamond window it may be advantageous to make the mounting ring more elongate or tubular in shape. The mounting ring may also have a tapered inner surface for receiving an optical fibre.

The mounting ring may be mounted within the chemically inert tubular body in a variety of ways. However, bolting or clamping arrangements can be complex and unreliable, especially under thermal cycling. Surprisingly, it has been found that a press-fit (pressure fitted) mounting ring provides a simple and reliable configuration using the previously described materials. In such an arrangement the chemically inert tubular body comprises an internally tapered end portion and the mounting ring is press-fit into the tapered end portion.

By providing a mounting ring made of a material which is selected to achieve reliable bonding to the diamond window, and using the above described press-fit configuration, the tubular body can then be selected from a range of chemically inert materials according to the probes intended use. By chemically inert, we mean that the tubular body is more chemically inert than the mounting ring. For example, the tubular body may be made of a material which is less reactive to acidic environments than the mounting ring. Example materials include inert and/or corrosion resistant alloys, ceramics, or composite materials. Nickel alloys have been found to be useful and particularly the commercially available Hastelloy™ superalloys such as Hastelloy C-276, a corrosion resistant Nickel-Molybdenum-Chromium alloy with addition of Tungsten. However, it will be understood that the chemically inert material may be selected according to the end use of the optical probe.

The chemically inert tubular body may be selected to have a variety of possible shapes according to its intended use. For many applications a circular or oval cross-sectional shape will be suitable. As previously described, the present invention is particularly useful for small components. Accordingly, the largest external diameter of the tubular member may be 30 mm or less, 20 mm or less, 15 mm or less, or 10 mm or less. The term "largest external diameter" is simply the diameter when the tubular body has a circular cross section. When the tubular member has a non-circular cross-section, such as an oval cross-section, then the largest external diameter refers to the largest distance across the cross-section in a direction perpendicular to a longitudinal axis of the tubular body.

The tubular body may have a wall thickness of 0.5 mm to 4 mm, 0.5 mm to 3.0 mm, 0.5 mm to 2.0 mm, 0.7 mm to 1.2 mm, or 0.8 mm to 1.0 mm. Furthermore, the internal diameter of the tubular member may be 0.2 mm to 20 mm, 0.3 mm to 15 mm, 0.4 mm to 10 mm, or 0.5 mm to 5 mm. Diamond window de-bonding has been found to be problematic for such a small chemically inert tubular body unless provided with an internal mounting ring according to the present invention.

The diamond window may be formed of single crystal or polycrystalline diamond material. Furthermore, the diamond may be CVD diamond material, HPHT diamond material or natural diamond. The diamond material should preferably be of an optical grade and may have an absorption coefficient $\beta$ equal to or less than 0.1 $cm^{-1}$, 0.05 $cm^{-1}$, 0.01 $cm^{-1}$, 0.005 $cm^{-1}$, or 0.001 $cm^{-1}$ at an operating wavelength of the laser tool. An exemplary operating wavelength is in the mid-infrared in the range 2 to 10 $\mu m$. For example, the optical probe may be configured to perform infrared spectroscopy, more particularly attenuated total reflectance (ATR) spectroscopy. In such an application, the optical component may be configured to couple to two optical fibres. One fibre is arranged to transmit an infrared beam into the sample and the other fibre is arranged to receive light reflected from the sample. This light may then be analysed to perform infrared spectroscopy. However, it should be noted that due to diamond material's low absorption across the infrared and visible region of the spectrum, other operating wavelengths may be utilized and the present invention is not limited to this infrared application.

The diamond window is advantageously provided with a metallization coating on an internal surface in an area around the aperture. The metallization coating can be provided on the diamond window between the diamond window and an inert metal braze join. The metallization coating may comprise a layer of a carbide forming metal. The metallization coating may further comprise an inert metal barrier layer between the layer of carbide forming metal and the braze join. By inert metal barrier we mean a material which is less reactive with the braze material than the carbide forming metal. Such a metallization coating aids bonding between the diamond window and the tubular body. A preferred metallization coating comprises a layer of a carbide forming material such as titanium, an inert barrier layer such as platinum, and a metal layer such as gold for soldering or brazing to the tubular body. The titanium provides a good bond with the diamond forming titanium carbide at an interface with the diamond. The gold provides a good bond to the tubular body. The platinum functions as an inert shield between the gold and titanium.

A braze join can be provided between the metallization coating and the mounting ring for bonding the diamond window to the tubular body. The braze join may comprise gold and/or tantalum. A gold-tantalum braze has been found to be useful as it is chemically inert and non-corrosive. The braze material can extend around the periphery of the diamond window to cover any exposed portions of the mounting ring around the diamond window and prevent adverse reaction of the mounting ring material with the surrounding chemical environment in use.

The present invention is particularly useful when applied to a small diamond window which is more susceptible to heating. Accordingly, the diamond window may have a thickness in the range 0.1 mm to 0.5 mm, 0.1 mm to 0.3 mm, 0.1 mm to 0.2 mm, or 0.1 mm to 0.2 mm. Furthermore, the diamond window may have a longest dimension in the range 1.0 mm to 10.0 mm, 1.0 mm to 8.0 mm, 1.5 mm to 5.0 mm, or 2.5 mm to 3.5 mm. Further still, the diamond window may have a width in the range 1.0 mm to 5.0 mm, 1.0 mm to 3 mm, or 1.5 mm to 2.5 mm.

The overlap between the diamond window and the mounting ring around the aperture may be 0.2 mm to 1.0 mm, 0.3 mm to 0.8 mm, 0.35 mm to 0.6 mm, or more preferably 0.4 mm to 0.5 mm. The relative size of the diamond window and the aperture can be selected to achieve a reliable bond between the diamond window and the mounting ring around the aperture and to provide an optimal thermal contact between the diamond window and the mounting ring.

One further problem which the present inventors have identified is that the diamond window can be damaged if it is knocked by an external member, such as a stirring apparatus within a chemical reactor in which the probe is placed. As such, it has been found to be advantageous to position the diamond window in a recess of the tubular body such that at least a portion of the tubular body extends beyond the diamond window to protect it from damage. The diamond window is thus disposed in a recess across the aperture, the diamond window having an area less than an area of the recess and greater than an area of the aperture. This arrangement ensures that the diamond window extends across the entire aperture while being wholly located within the recess such that that diamond window is protected.

The aforementioned recess may be formed by a plurality of projections with a plurality of openings disposed therebetween around the diamond window. The openings allow fluid to flow more readily into and out of the recess so that fluid adjacent to the diamond window is representative of the composition of a sample which is being analysed. Without such openings, it has been found that fluid can become trapped in the recess such that it doesn't mix and react with other components in the sample resulting in misleading readings for applications such as attenuated total reflection spectroscopy.

The diamond window is preferably bonded to the mounting ring around the aperture to form a seal all around the aperture. This will prevent fluid or other debris entering the tubular body and fouling the optical fibre.

In addition to the problem of the diamond window de-bonding, the present inventors have identified another problem associated with undue heating of the diamond window in an optical tool. As stated in U.S. Pat. No. 4,170,997, diamond has a high refractive index. As such, U.S. Pat. No. 4,170,997 teaches that it is advantageous to apply an antireflective coating to the diamond window to maximize light transmission. This may be applied on one or both sides of the diamond window. Indeed, it is well known to use such an antireflective coating when using diamond as a window material for optical applications. However, when used in small devices such as optical probes, the present inventors have found that heating during operation leads to delamination of the antireflective coating. Delamination of the antireflective coating can lead to the formation of hot-spots in the window material and possible fracture of the window. Accordingly, for small devices it is advantageous to use a diamond window without an antireflective coating.

Figure 2:
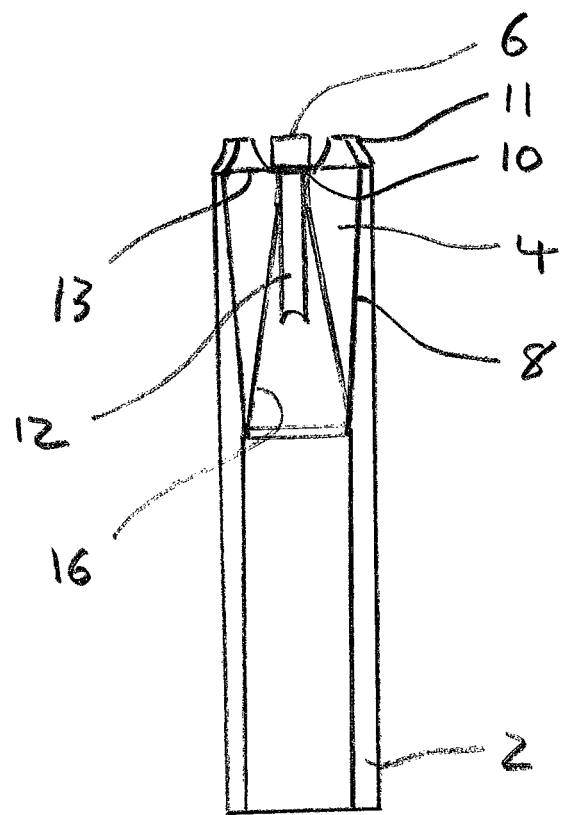
FIG. 2 illustrates a side cross-sectional view of a diamond window component for an optical tool according to an embodiment of the present invention.
Figure 3:
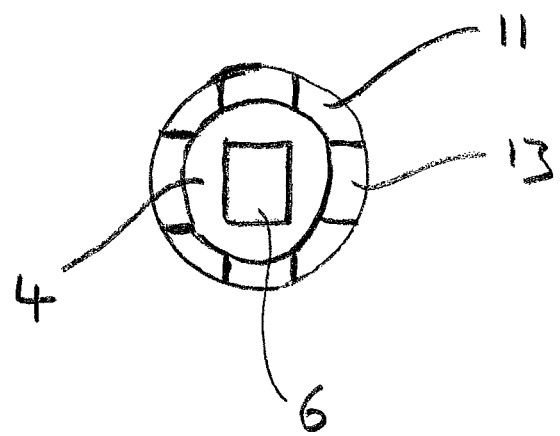
FIG. 3 illustrates an end view of a diamond window component for an optical tool according to an embodiment of the present invention.

FIGS. 1 to 3 show various views of a diamond window component for an optical tool according to an embodiment of the present invention. The component comprises a chemically inert tubular body 2 (e.g. made of hastelloy C-276), a mounting ring 4 (e.g. made of molybdenum), and a diamond window 6. The chemically inert tubular body 2 comprises an end portion with an internal taper 8 and the mounting ring 4 is press-fit into the internal taper 8. The mounting ring 4 has an outer shape configured to cooperatively fit into the internal taper 8 of the tubular body 2 and hold the mounting ring 4 in place. An additional braze join may be provided if required. The mounting ring is mounted to be substantially flush (0 mm+/−0.1 mm) with a portion of the end wall of the tubular body 2. The tubular body comprises a plurality of portions 11 projecting from the end wall 13 and extending beyond the diamond window 6 so as to protect the diamond window from external damage. The plurality of projections 11 have open portions therebetween to allow fluid to flow more readily to and from the diamond window 6.

The diamond window 6 is joined to the mounting ring 4 using a gold/tantalum braze 10. The diamond window is brazed at a temperature of 1240° C. A portion of an optical fibre 12 is shown mounted within the mounting ring 4. The mounting ring has an internal taper 16 such that the optical fibre can be readily threaded along the tubular body 2 and into the aperture of the mounting ring 4 so as to be correctly aligned with the diamond window 6. An end of the tubular body 2 opposite to the end in which the diamond window is disposed is configured for attachment to an end of an optical fibre to transmit light down the interior channel (not shown). In the illustrated embodiment, an optical fibre can be inserted into the interior channel of the tubular body 2 and secured with screws.

The illustrated embodiment has been configured to reliably mount the diamond window while simultaneously ensuring that the component will be inert to harsh chemical environments. By press-fitting the molybdenum mounting ring into the end of the hastelloy tube, the majority of the molybdenum is protected from the external chemical environment. An end portion of the molybdenum around the diamond window is protected by the inert gold braze used to attach the diamond window. An inert braze such as a gold braze is useful to form an effective seal between the diamond window, the mounting ring and/or the tubular body.

In use, the component is attached to the end of an optical fibre to form an optical probe. The small size of the probe allows insertion into narrow passages. The high thermal conductivity of the diamond and molybdenum allows heat to be conducted away from the diamond window. The high thermal conductivity of the braze also aids in providing a good thermal contact between the diamond window and the mounting ring for conducting heat away from the diamond window in use.

The relatively small difference in thermal expansion coefficient between the diamond window and the molybdenum mounting ring aids in reducing differences in thermal expansion in use. Stress at the join between the mounting ring and the diamond window is reduced when compared with prior art arrangements and failure of the bonding between the diamond window and the mounting ring is prevented. The provision of a metallization coating of, for example, titanium, platinum, and/or gold can also aid in preventing de-lamination of the diamond window from the mounting ring in use.

The location of the diamond window in a recess in the end of the tubular body prevents the diamond window from being damaging or knocked off. Furthermore, the relative size of the diamond window and the aperture is selected to achieve a reliable bond between the diamond window and the mounting ring around the aperture and to provide an optimal thermal contact between the diamond window and the mounting ring.

While this invention has been particularly shown and described with reference to preferred embodiments, it will be understood to those skilled in the art that various changes in form and detail may be made without departing from the scope of the invention as defined by the appendant claims.

What is claimed is:

1. A component for an optical probe, the component comprising:
    a tubular body defining an internal channel and an opening;
    a mounting ring which is mounted within the internal channel and configured to define an aperture aligned with the opening; and
    a window disposed across the aperture and bonded to the mounting ring around the aperture,
    wherein the window is diamond,
    wherein the mounting ring comprises a material having a coefficient of linear thermal expansion a of $14.0 \times 10^{-6}$ $K^{-1}$ or less at 20° C. and a thermal conductivity of 60 $Wm^{-1}K^{-1}$ or more at 20° C.,
    wherein the tubular body is made of a chemically inert material, and
    wherein the tubular body comprises an internally tapered end portion, the mounting ring comprises an internal taper for receiving an optical fibre, and the mounting ring is press-fit into the tapered end portion.

2. A component according to claim 1, wherein a is one of: $12.0 \times 10^{-6}$ $K^{-1}$ or less; $10.0 \times 10^{-6}$ $K^{-1}$ or less; $8.0 \times 10^{-6}$ $K^{-1}$ or less; $6.0 \times 10^{-6}$ $K^{-1}$ or less; and $4.0 \times 10^{-6}$ $K^{-1}$ or less.

3. A component according to claim 1, wherein the thermal conductivity is one of: 60 $Wm^{-1}K^{-1}$ or more; 80 $Wm^{-1}K^{-1}$ or more; 100 $Wm^{-1}K^{-1}$ or more; 120 $Wm^{-1}K^{-1}$ or more; and 140 $Wm^{-1}K^{-1}$ or more.

4. A component according to claim 1, wherein the material of the mounting ring comprises one or more of molybdenum, chromium, tungsten, nickel, rhodium, ruthenium, diamond, silicon carbide (SiC), tungsten carbide (WC), aluminium nitride (AlN), titanium zirconium molybdenium (TZM), tungsten nickel iron (WNiFe), and tungsten nickel copper (WNiCu).

5. A component according to claim 1, wherein the mounting ring is formed of molybdenum.

6. A component according to claim 1, wherein the mounting ring is coated with a chemically inert material around the diamond window within the opening.

7. A component according to claim 1, wherein the tubular body comprises an end portion which extends beyond the diamond window to protect the diamond window from damage in use.

8. A component according to claim 1, wherein the end portion comprises a plurality of projections which extend beyond the diamond window with openings therebetween.

9. A component according to claim 1, wherein the diamond is a diamond material having an absorption coefficient β equal to or less than 0.1 $cm^{-1}$, 0.05 $cm^{-1}$, 0.01 $cm^{-1}$, 0.005 $cm^{-1}$, or 0.001 $cm^{-1}$ at an operating wavelength of the optical probe.

10. A component according to claim 9, wherein the diamond material has an absorption coefficient β equal to or less than 0.1 $cm^{-1}$, 0.05 $cm^{-1}$, 0.01 $cm^{-1}$, 0.005 $cm^{-1}$, or 0.001 $cm^{-1}$ at an operating wavelength in a mid-infrared range.

11. A component according to claim 1, wherein the diamond window is free of antireflective coating in an area across the aperture.

12. A component according to claim 1, wherein an inert metal braze join is provided between the diamond window and the mounting ring.

13. A component according to claim 12, wherein the inert metal braze join comprises gold and/or tantalum.

14. A component according to claim 12, wherein a metallization coating is provided on the diamond window between the diamond window and the inert metal braze join.

15. A component according to claim 14, wherein the metallization coating comprises a layer of a carbide forming metal.

16. A component according to claim 15, wherein the metallization coating further comprises an inert metal barrier layer between the layer of carbide forming metal and the braze join.

\* \* \* \* \*